United States Patent
Sugiyama et al.

(10) Patent No.: US 8,267,220 B2
(45) Date of Patent: Sep. 18, 2012

(54) ELECTRIC POWER STEERING CONTROL APPARATUS

(75) Inventors: Akinobu Sugiyama, Chiyoda-ku (JP);
Takanori Matsunaga, Chiyoda-ku (JP);
Hideyuki Tanaka, Chiyoda-ku (JP);
Hiroyuki Kozuki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 984 days.

(21) Appl. No.: 12/132,209

(22) Filed: Jun. 3, 2008

(65) Prior Publication Data
US 2009/0000857 A1 Jan. 1, 2009

(30) Foreign Application Priority Data
Jun. 29, 2007 (JP) ................. 2007-172005

(51) Int. Cl.
B62D 5/04 (2006.01)
(52) U.S. Cl. .......... 180/446; 180/443; 180/444; 701/41; 701/42
(58) Field of Classification Search ............ 180/444, 180/446, 443; 701/41, 42
See application file for complete search history.

(56) References Cited

U.S. PATENT DOCUMENTS
2007/0205041 A1* 9/2007 Nishizaki et al. ............. 180/446

FOREIGN PATENT DOCUMENTS
| DE | 69533576 T2 | 11/2005 |
| DE | 102004051338 A1 | 4/2006 |
| DE | 102005003180 A1 | 7/2006 |
| DE | 602004003307 T2 | 6/2007 |
| JP | 03-243470 A | 10/1991 |
| JP | 2000-168600 A | 6/2000 |
| JP | 2001-334948 A | 12/2001 |
| JP | 2003-40120 A | 2/2003 |
| JP | 2006-335228 A | 12/2006 |
| JP | 2007-161006 A | 6/2007 |
| KR | 1993-21480 A | 11/1993 |

* cited by examiner

Primary Examiner — Lesley D Morris
Assistant Examiner — Jacob Knutson
(74) Attorney, Agent, or Firm — Sughrue Mion, PLLC

(57) ABSTRACT

An electric power steering control apparatus can reduce a steering vibration such as shimmy vibration generated due to the structure of a vehicle without adding new mechanism elements. The apparatus includes a torque sensor for detecting steering torque generated by a driver, a torque controller for calculating an assist torque current for assisting the steering torque based on the detected steering torque, a vehicle speed detector for detecting the speed of the vehicle, a specific frequency detector for detecting a specific frequency from the detected vehicle speed, a motor angular velocity calculator for calculating a motor angular velocity from a motor angle detected by an angle detector, a phase compensator for converting a vibration frequency of the motor angular velocity, and a vibration suppression current calculator for calculating a vibration suppression current to suppress the steering vibration from respective output signals of the phase compensator and the specific frequency detector.

9 Claims, 7 Drawing Sheets

ELECTRIC POWER STEERING CONTROL APPARATUS

BACKGROUND OF THE INVENTION

1. Field of the Invention

The present invention relates to an electric power steering control apparatus that serves to assist a steering force of a driver by means of the rotational force of an electric motor (hereinafter also referred to simply as a "motor").

2. Description of the Related Art

In general, an electric power steering apparatus is constructed such that the steering torque generated by driver's rotational operation of the steering wheel of a vehicle is detected, and a current corresponding to the steering torque is supplied to the electric motor, which is arranged to be in engagement with an appropriate mechanism of a steering system, to drive and rotate the electric motor, whereby assist torque to driver's steering torque is generated to perform a steering operation.

However, in such a steering system, there has been known that a tire vibration called shimmy generated due to the structure of the vehicle (i.e., generated in a rotational direction of the steering wheel during travel of the vehicle according to a deviation or shift of wheel balance) or a tire vibration called brake judder (i.e., generated upon brake operation due to the eccentricity of a brake rotor) is transmitted to the steering wheel, thereby generating a large vibration of the steering system.

FIG. 7 is an explanatory view that shows one example of the vibration of a steering system, wherein the relation between a shimmy vibration (steering torque) and the traveling speed of a vehicle (vehicle speed) is shown.

Thus, in order to suppress such the steering vibration, there has hitherto been proposed a technique that sets the handle shaft conversion inertia decided by the inertia of an electric motor (e.g., brushless motor) and the speed reduction gear ratio of a reduction gear mechanism to a value within the range from $4 \times 10^{-2}$ [kg·m$^2$] to $10 \times 10^{-2}$ [kg·m$^2$] (see, for example, a first patent document: Japanese patent application laid-open No. 2003-40120).

In this case, in order to suppress road noise such a kick back from a road surface, etc., a relatively large inertia of $4 \times 10^{-2}$ [kg·m$^2$] or more is permitted, and deterioration in steering feeling resulting from a sense of inertia due to the large inertia is supplemented by means of inertia compensation control of the steering system.

In addition, in the past, there has also been proposed a technique that sets a complementary sensitivity function with respect to vibration frequencies to a value near "1" in a frequency band where there exists an external disturbance which should not be suppressed, but sets to a value near "0" in a frequency band where there exists an external disturbance that should be transmitted (see, for instance, a second patent document: Japanese patent application laid-open No. 2001-334948).

In this case, too, external disturbances can be suppressed by permitting relatively large motor inertia. That is, with respect to unnecessary external disturbances (not to be transmitted), motor inertia is positively made use of, whereas motor inertia, which is felt by the driver when performing a steering operation, is compensated for in a torque control system.

In the conventional electric power steering control apparatuses as stated above, according to the techniques of the above-mentioned first and second patent documents, the vibration is suppressed by the large motor inertia, but the larger the inertia, the lower the resonance frequency of the steering mechanism becomes, so it is necessary to attenuate even the frequency band of load information in which there exist external disturbances that should be transmitted, thus giving rise to a problem that it becomes difficult to grasp road surface conditions.

SUMMARY OF THE INVENTION

Accordingly, the present invention is intended to solve the problem as referred to above, and has for its object to obtain an electric power steering control apparatus which is capable of suppressing the vibration of a steering system without adding new mechanical parts while providing no influence on the steering feeling of a driver by performing vibration suppression control based on the angular velocity of an electric motor, only with respect to a frequency band of the steering vibration (shimmy vibration, etc.) generated due to the structure of a vehicle.

Bearing the above object in mind, an electric power steering control apparatus according to the present invention includes a steering torque detection section that detects steering torque generated by a driver of a vehicle; a motor that generates assist torque in accordance with the steering torque; a motor angular velocity detection section that detects the angular velocity of the motor; a specific frequency detection section that detects the frequency of a steering vibration generated due to the structure of the vehicle; a phase compensation section that converts the phase of the motor angular velocity based on a detected value of the motor angular velocity; and a vibration suppression current calculation unit that calculates a steering vibration suppression current for suppression of the steering vibration based on the respective output signals of the specific frequency detection section and the phase compensation section.

According to the present invention, the vibration (shimmy vibration etc.) of the steering system resulting from the structure of the vehicle is suppressed based on the specific frequency detection section, so it is possible to reduce the unpleasant vibration of the steering system without adding any new mechanism element while giving no influence on the steering feeling of the driver.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described while referring to the accompanying drawings. Here, note that the present invention can be realized by means of software in a microcomputer, and a hardware construction of the invention can be achieved by applying a well-known electric power steering apparatus, so a detailed description of the hardware construction is omitted here.

Embodiment 1

Figure 1:
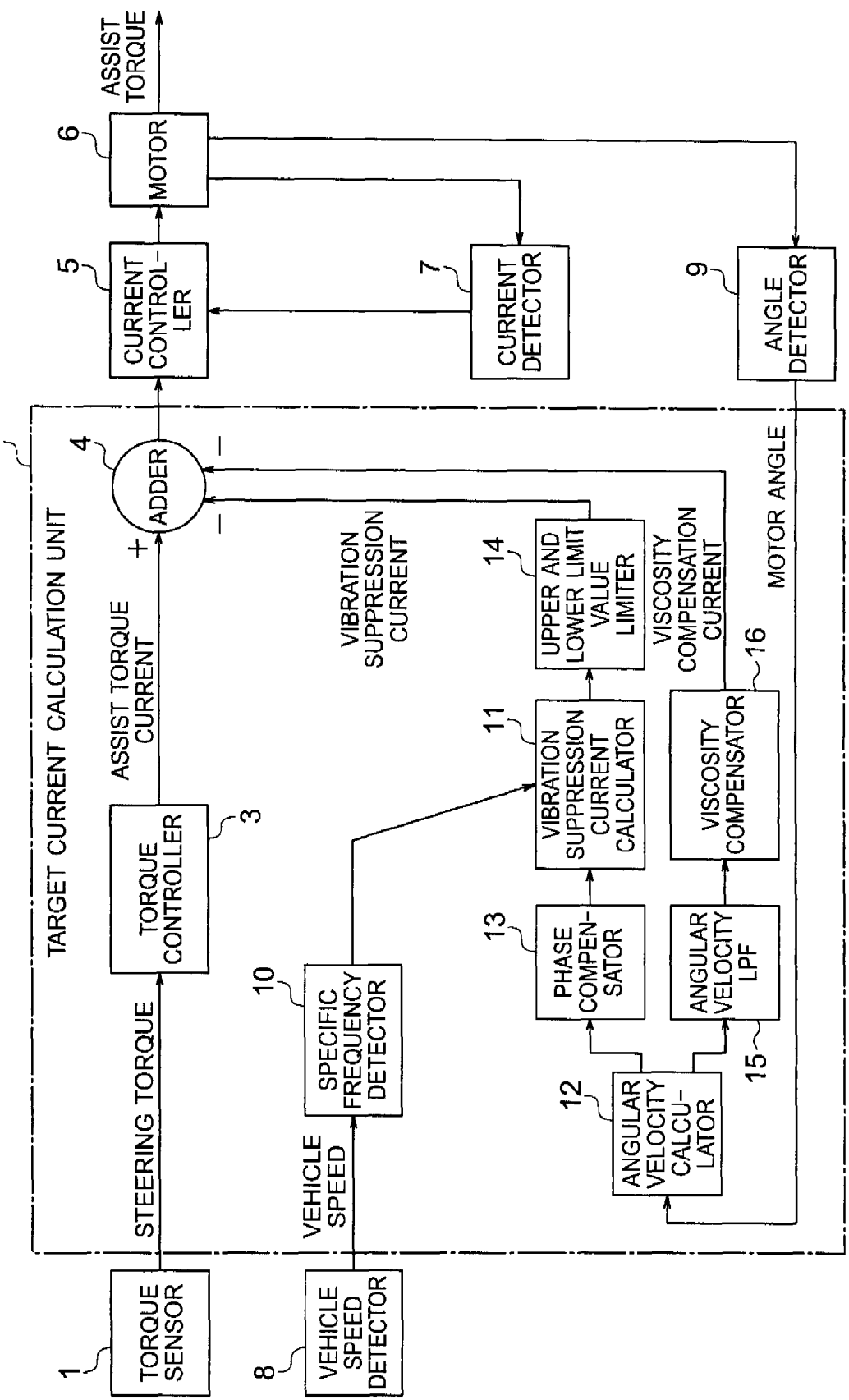
FIG. 1 is a block diagram showing the construction of an electric power steering control apparatus according to a first embodiment of the present invention.

Referring to the drawings and first to FIG. 1, there is shown a block diagram of the construction of an electric power steering control apparatus according to a first embodiment of the present invention.

In FIG. 1, connected to a target current calculation unit 2 which constitutes a major part of the first embodiment of the present invention, are a plurality of sensors including a torque sensor 1 for detecting the steering torque applied to the steering wheel of a vehicle by a driver thereof, a vehicle speed detector 8 for detecting the traveling speed of the vehicle (hereinafter also referred to as a vehicle speed) based on an output signal of a wheel speed sensor that senses the rotational speed of a road wheel, and an angle detector 9 for detecting the rotational angle of an electric motor 6 (hereinafter also referred to as a motor angle). In addition, the electric motor 6 for generating assist torque is connected to the target current calculation unit 2 through a current controller 5.

The target current calculation unit 2 includes a torque controller 3, an adder 4, a specific frequency detector 10, a vibration suppression current calculator 11, an angular velocity calculator 12, a phase compensator 13, an upper and lower limit value limiter 14, an angular velocity (rotational speed) low-pass filter (LPF) 15, and a viscosity compensator 16.

The torque controller 3 calculates an assist torque current for assisting the steering torque based on an output signal (detected steering torque value) of the torque sensor 1.

The specific frequency detector 10 detects a specific frequency based on the vehicle speed detected by the vehicle speed detector 8.

The vibration suppression current calculator 11 calculates a steering vibration suppression current (hereinafter simply referred to as a "vibration suppression current") for suppressing a steering vibration (shimmy vibration, etc.) generated due to the structure of the vehicle based on the output signals of the phase compensator 13 and the specific frequency detector 10.

The angular velocity calculator 12 calculates the angular velocity of the motor 6 based on the motor angle detected by the angle detector 9.

The phase compensator 13 converts the phase of the angular velocity of the motor 6 calculated by the motor angular velocity calculator 12 into a post compensation phase.

The upper and lower limit value limiter 14 sets an upper limit value and a lower limit value of the vibration suppression current, and limits the vibration suppression current within a predetermined range.

The angular velocity LPF 15 removes high frequency components equal to or more than the steering frequency from the angular velocity of the motor 6 calculated by the motor angular velocity calculator 12 so as to pass only low frequency components.

The viscosity compensator 16 calculates a viscosity compensation current based on the LPF signal of the angular velocity of the motor 6 output from the angular velocity LPF 15.

The adder 4 calculates a target current by adding the assist torque current calculated by the torque controller 3, the vibration suppression current limited by the upper and lower limit value limiter 14, and the viscosity compensation current calculated by the viscosity compensator 16, and inputs it to the current controller 5.

In this regard, it is to be noted that in FIG. 1, there is shown the case in which the vibration suppression current and the viscosity compensation current are subtractively corrected with respect to the assist torque current.

The current controller 5 sets a command value of a drive voltage to be applied to a terminal of the motor 6 in such a manner as to make a motor current (i.e., a detected value of a drive current supplied to the motor 6) detected by a current detector 7 coincide with the target current, and outputs it as a pulse width modulation (PWM) signal for example to the motor 6 so that the motor 6 is thereby driven to generate assist torque.

Here, reference will be made to concrete processing of the specific frequency detector 10 and the vibration suppression current calculator 11 in the target current calculation unit 2.

In general, in the steering system of the vehicle, the frequency band of a shimmy vibration generated due to the unbalance of the tires is in the range of 10-20 Hz, and the frequency band of brake judder generated due to the eccentricity of brake rotors is similarly in the range of 10-20 Hz.

Figure 7:
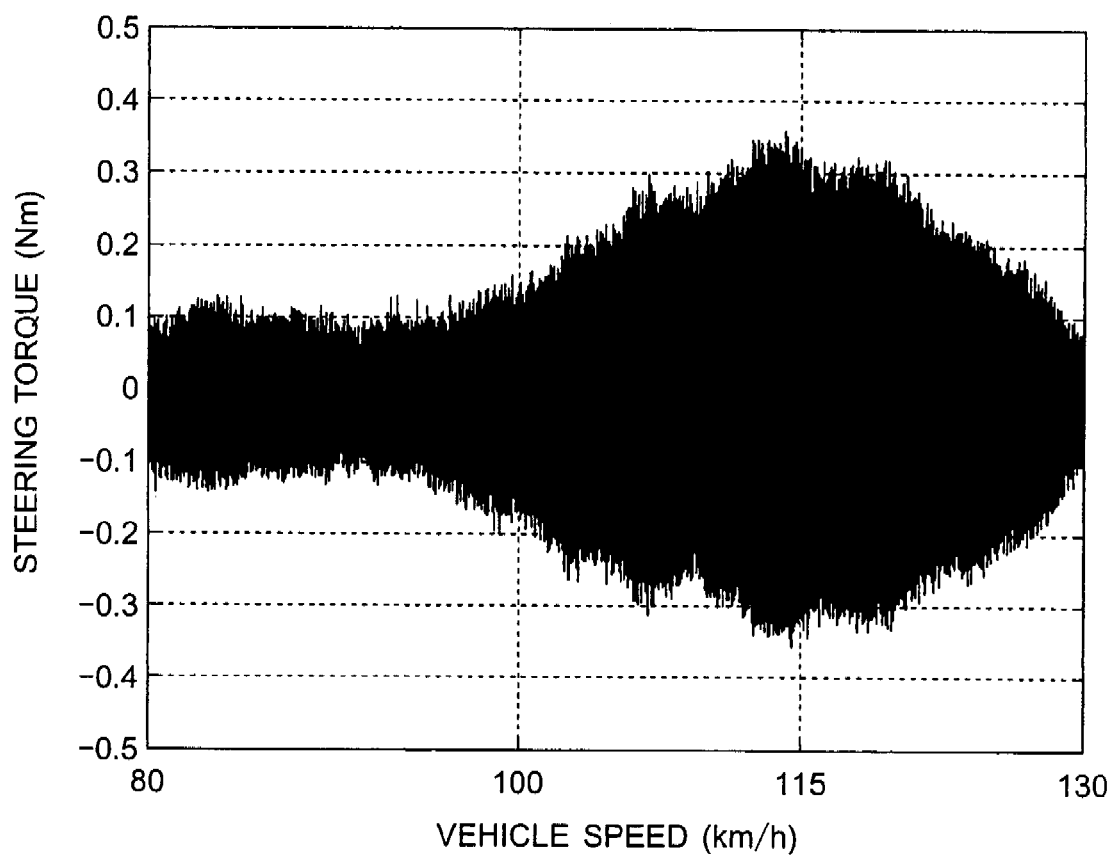
FIG. 7 is an explanatory view showing a relation between a general shimmy vibration (steering torque) and a vehicle speed.

In addition, the amplitude and the frequency of the steering vibration generated due to the shimmy vibration or brake judder depend on the vehicle speed of the vehicle during traveling, as shown in FIG. 7. In FIG. 7, the axis of abscissa (vehicle speed) corresponds to the rotational speed (frequency) of the tires, wherein the vehicle speed=115 km/h or thereabout corresponds to a frequency band (10-20 Hz) in which the steering system is most liable to resonate. Accordingly, the specific frequency detector 10 can obtain from the vehicle speed the frequency band in which a vibration of 10-20 Hz is generated.

Subsequently, the vibration suppression current calculator 11 sets a gain based on a specific frequency output from the specific frequency detector 10, calculates the vibration suppression current by multiplying an output signal (to be described later) of the phase compensator 13 by the gain, and generates motor assist torque which is adapted to suppress the steering vibration. As a result, unpleasant vibrations will not be transmitted to the driver.

Here, it is to be noted that in the vibration suppression current calculator 11, there is generated a current based on the motor angular velocity, so in the steer pattern (abrupt steering, etc.) in which the motor angular velocity becomes large, the influence on the steer feeling is feared. However, in general, the frequency in which the driver can perform a steering operation is 5 [Hz] or less, and the vibration suppression current is calculated based on only the frequency band of 10-20 [Hz] by means of the specific frequency detector 10, so the influence on the steer feeling can be avoided.

Next, reference will be made to specific processing of the phase compensator 13 and the upper and lower limit value limiter 14.

In general, depending upon the combination of the motor inertia and the shimmy vibration frequency, the effect of the vibration suppression may sometimes become higher under vibration suppression control with the combination of a phase advanced differential term and a phase retarded integral term than in the control of suppressing the vibration by the damping of the same phase as that of the motor angular velocity.

Accordingly, the phase compensator 13 calculates a proportional gain of the motor angular velocity, a time differential signal of the motor angular velocity, a differential gain of the differential signal, a time integral signal of the motor angular velocity, and an integral gain of the integral signal, and inputs to the vibration suppression current calculator 11 a phase compensated value that is obtained by combining the proportional term, the differential term, and the integral term with one another. As a result, the effect of the vibration suppression in the vibration suppression current calculator 11 can be enhanced.

In addition, the upper and lower limit value limiter 14 is designed to transmit the shimmy vibration and brake judder to the driver to some extent by limiting the vibration suppression current with the upper and lower limit values. Thus, it is possible to inform the driver of the abnormality of the vehicle.

Here, note that when the vibration is completely suppressed by means of the vibration suppression current without using the upper and lower limit value limiter 14, an excessively large load might be imposed on mechanical parts between the motor 6 and the tires. Accordingly, it is desirable to make a design such that the upper and lower limit values with respect to the vibration suppression current be set by the upper and lower limit value limiter 14, while taking into consideration the load on the mechanical parts.

Next, reference will be made to specific processing of the viscosity compensator 16.

The viscosity compensator 16 serves to suppress fluctuation of the steering wheel as in a case when the steering wheel is made hands-free from holding thereof by the driver by performing steering control so as to increase convergency of the steering vibration in the vicinity of the intrinsic vibration frequency of the vehicle lying within the steering frequency band based on a well-known technique (e.g., Japanese patent application laid-open No. H08-175404).

Such viscosity compensation is performed after the vibration has been limited to the steering frequency band by means of the angular velocity LPF 15, so that it is used only in the steering frequency band.

However, the viscosity compensator 16 is required to be set in such a manner that the viscosity compensation thereof can be carried out in the steering frequency band while exerting no influence on the steering feeling of the driver. In addition, a control quantity for viscosity compensation, being different from a control quantity for the vibration suppression current which serves to suppress the shimmy vibration or the like, has to be designed separately from the vibration suppression control, as shown in FIG. 1.

Next, reference will be made to specific processing of the motor angular velocity calculator 12.

The angular velocity calculator 12 calculates the angular velocity of the motor 6 by differentiating the detected value of the motor angle from the angle detector 9, but high frequency noise is liable to be superposed on the calculated value obtained only with a simple differential calculation, so the motor angular velocity with reduced high frequency noise is calculated by applying moving average processing or low-pass filtering processing for interruption of high frequency bands to the differential calculation value.

Here, note that the moving average may be calculated as an average value of the last value and the current value of the differential calculation value, or may be obtained as an average value of past values from the last two to the last several tens of values of the differential calculation value, or may be calculated as a weighted average thereof. In addition, the high frequency band may be interrupted by a combination of the moving average processing and the low-pass filtering processing.

Now, reference will be made to the operation of the electric power steering control apparatus according to the first embodiment of the present invention as illustrated in FIG. 1, while referring to a flow chart in FIG. 2.

Here, note that what is different of the electric power steering control apparatus according to the first embodiment from known ones (in which the shimmy vibration is mechanically suppressed by setting the inertia of the motor 6 to a large value) is an algorithm that suppresses the vibration by means of the vibration suppression current calculated by the vibration suppression current calculator 11.

Accordingly, for the control of the drive current to be supplied to the motor 6, a general type of control (e.g., proportional, integral and differential (PID) type current feedback control, open-loop control based on a target current and a motor rotation signal, etc.) can be applied in a digital method or an analog method.

Hereinafter, description will be given by focusing on such an algorithm performed by the target current calculation unit 2 until the target current for the motor 6 is calculated.

Figure 2:
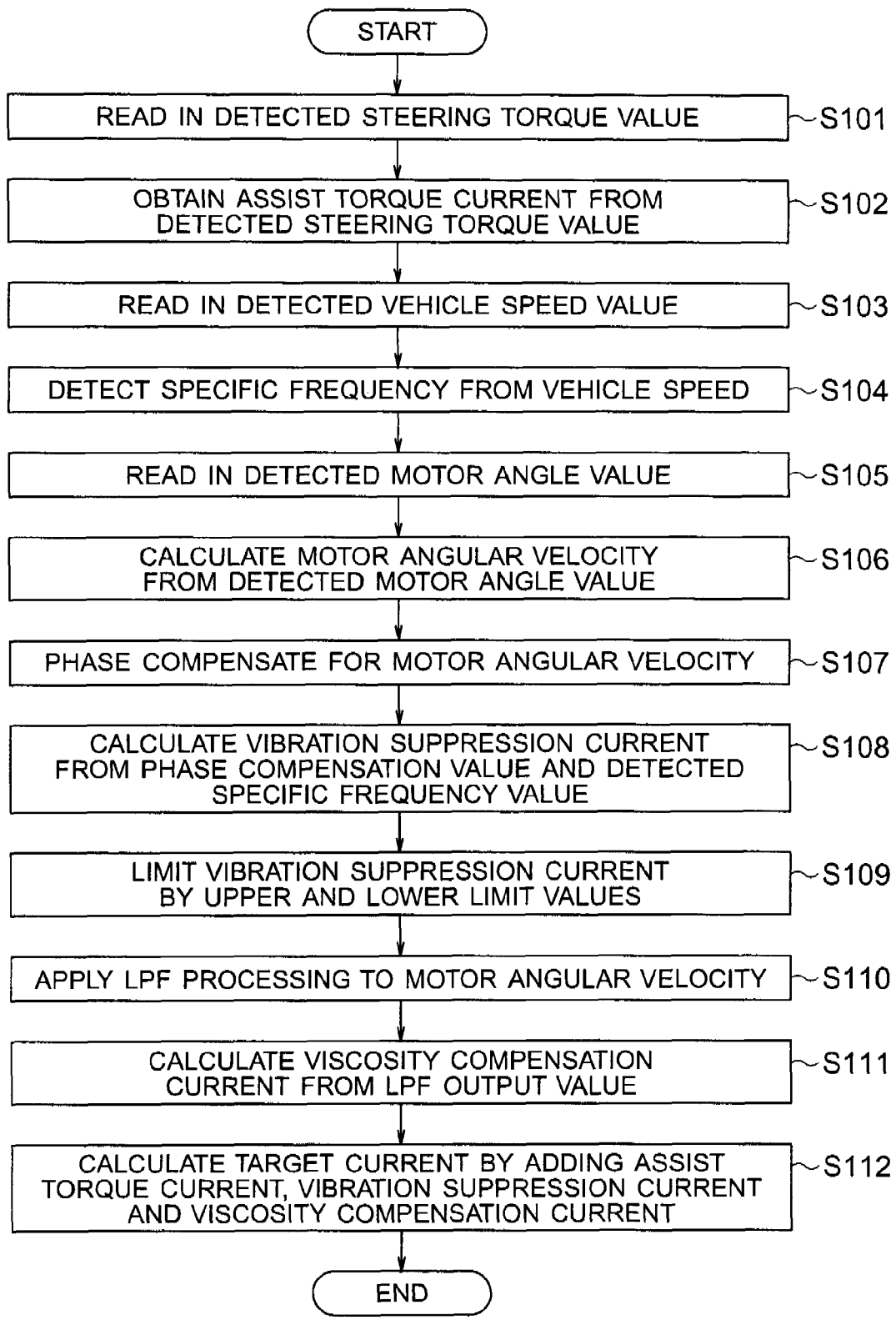
FIG. 2 is a flow chart illustrating an operation algorithm according to the first embodiment of the present invention.

First of all, in FIG. 2, the target current calculation unit 2 reads the detected value of the steering torque from the torque sensor 1 into a microcomputer, and stores it in memory therein (step S101).

Subsequently, the torque controller 3 reads in the detected steering torque value stored in the memory, calculates the assist torque current based on the detected steering torque value with the use of a map, and stores it in the memory (step S102).

Also, the target current calculation unit 2 reads the detected vehicle speed value from the vehicle speed detector 8 into the microcomputer and stores it in the memory (step S103).

Then, the specific frequency detector 10 reads in the detected vehicle speed value stored in the memory and detects the specific frequency based on the detected vehicle speed value (step S104).

In addition, the target current calculation unit 2 reads in the detected motor angle value from the angle detector 9, and stores it in the memory (step S105).

Subsequently, the motor angular velocity calculator 12 reads in the detected motor angle value, calculates the motor angular velocity based on the detected motor angle value, and stores it in the memory (step S106).

In addition, the phase compensator 13 reads in the calculated value of the motor angular velocity, converts the phase of the motor angular velocity, and stores it in the memory as a phase compensated value (step S107).

Thereafter, the vibration suppression current calculator 11 sets the gain based on the detected specific frequency value, multiplies the phase compensated value by the gain, and stores it in the memory as a vibration suppression current (step S108).

Also, the upper and lower limit value limiter 14 reads in the vibration suppression current, limits the vibration suppression current by the upper and lower limit values, and stores it in the memory as a final vibration suppression current (step S109).

On the other hand, the angular velocity LPF 15 reads in the calculated value of the motor angular velocity, applies low-pass filtering processing to the motor angular velocity thereby to remove high frequency components equal to or more than the steering frequency, and then stores it in the memory as an LPF output of the motor angular velocity (step S110).

In addition, the viscosity compensator 16 reads in the LPF output of the motor angular velocity, multiplies the motor angular velocity by a preset gain, and stores it in the memory as a viscosity compensation current (step S1).

Finally, the adder 4 adds up the assist torque current, the vibration suppression current, and the viscosity compensation current stored in the memory thereby to calculate a target current for the motor 6, and stores it in the memory (step S112).

Hereinafter, by repeatedly performing the processing operations in steps S101 through S112 at each control sampling period, the target current for the motor 6 is calculated in a successive manner.

Although in the above-mentioned first embodiment, the assist torque current is obtained by map calculation and the vibration suppression current and the viscosity compensation current are obtained by gain multiplication, each of the assist torque current, the vibration suppression current and the viscosity compensation current may be obtained by the use of either map calculation or gain multiplication.

In addition, the assist torque current is obtained by map calculation based on the detected steering torque value, but instead, by inputting the detected steering torque value to a digital or analog phase compensator, the assist torque current may be calculated by map calculation based on the phase compensated value of the steering torque that is obtained by the digital or analog phase compensator.

Moreover, the map calculation of the assist torque current may be variable in accordance with the vehicle speed.

Further, for the angle detector 9, there may be used a sensor of any construction such as ones of a magnetic type, an optical type, etc., as long as angle detection can be made.

In addition, it is constructed such that in the phase compensator 13, the proportional gain calculation of the motor angular velocity, the calculation of the time differential signal of the motor angular velocity, the differential gain calculation of the differential signal, the calculation of the time integral signal of the motor angular velocity, and the integral gain calculation of the integral signal are performed, and phase compensation is carried out by combining the proportional term, the differential term and the integral term with one another, but it may instead be constructed such that at least one of the calculation of the proportional gain, the calculation of the time differential signal and the differential gain, and the calculation of the time integral signal and the integral gain, is carried out.

Moreover, it may further be constructed such that in the phase compensator 13, by applying band-pass filtering processing to the motor angular velocity to calculate a band-pass filter gain thereof, or by applying high-pass filtering processing to the motor angular velocity to calculate a high-pass filter gain thereof, or by applying low-pass filtering processing to the motor angular velocity to calculate a low-pass filter gain thereof, filtering processing is performed based on at least one of the high-pass filter gain calculation, the low-pass filter gain calculation, and the band-pass filter gain calculation is performed.

Further, in the adder 4, the target current is calculated by adding the assist torque current output from the torque controller 3, the vibration suppression current output from the upper and lower limit value limiter 14, and the viscosity compensation current output from the viscosity compensator 16, but a compensation current controller (not shown) including a friction compensation controller, an inertia compensation controller and so on may be added, similar to known apparatuses, so that an output value of the compensation current controller can be further added so as to obtain the target current.

As described above, the electric power steering control apparatus according to the first embodiment of the present invention includes a steering torque detection section (torque sensor 1) that detects steering torque generated by the driver of the vehicle, the motor 6 that generates assist torque corresponding to the steering torque, a motor angular velocity detection section (angle detector 9 and angular velocity calculator 12) that detects the motor angular velocity of the motor 6, a specific frequency detection section (specific frequency detector 10) that detects the frequency of a steering vibration (shimmy vibration, etc.) generated due to the structure of the vehicle, a phase compensating section (phase compensator 13) that converts the phase of the motor angular velocity based on the detected value (calculated value) of the motor angular velocity, and a vibration suppression current calculation section (vibration suppression current calculator 11) that calculates a vibration suppression current to suppress the steering vibration based on the respective output signals (specific frequency, phase compensated value) of the specific frequency detector 10 and the phase compensator 13.

With the above arrangement, the vibration suppression current calculator 11 calculates the vibration suppression current based on the specific frequency detector 10 so as to suppress the steering vibration (shimmy vibration, etc.) generated due to the structure of the vehicle, whereby it is possible to reduce the unpleasant steering vibration without adding any new mechanism element while giving no influence on the steering feeling of the driver.

In addition, the phase compensator 13 can be constructed to include at least one of a proportional gain calculation section that amplifies and deamplifies the magnitude of the motor angular velocity, a combination of a differentiator that calculates a time differential signal for the motor angular velocity and a differential gain calculation section that amplifies and deamplifies the differential signal, and a combination of an integrator that calculates a time integral signal for the motor angular velocity and an integral gain calculation section that amplifies and deamplifies the integral signal.

Thus, by constructing the phase compensator 13 in a manner to include at least one of the proportional gain, the combination of the differentiator and the differential gain, and the combination of the integrator and the integral gain, it is possible to calculate the vibration suppression current in total including not only the motor angular velocity but also the inertia term or the angle term of the motor 6, so the effect of the vibration suppression can be further improved.

Moreover, the phase compensator 13 can be constructed to include at least one of a band-pass filter gain calculation section that calculates a band-pass filter gain for amplifying and deamplifying a band-pass filtered signal produced by applying band-pass filtering processing on the motor angular velocity, a high-pass filter gain calculation section that calculates a high-pass filter gain for amplifying and deamplifying a high-pass filtered signal produced by applying high-pass filtering processing to the motor angular velocity, a low-pass filter gain calculation section that calculates a low-pass filter gain for amplifying and deamplifying a low-pass filtered signal produced by applying low-pass filtering processing to the motor angular velocity.

Thus, by constructing the phase compensator 13 in a manner to include at least one of a combination of the band-pass filter and the band-pass filter gain, a combination of the high-pass filter and the high-pass filter gain, and the combination of the low-pass filter and the low-pass filter gain, it is possible to achieve good vibration suppression control which is less prone to be influenced by high frequency noise.

Further, provision is also made for a vehicle speed detection section (vehicle speed detector 8) that detects the vehicle speed of the vehicle, and the specific frequency detector 10 detects a frequency at which the steering vibration is generated in accordance with the vehicle speed.

Since in this manner, the specific frequency at which the steering vibration (shimmy vibration, etc.) occurs is detected based on the vehicle speed, and the steering vibration is in a proportional relation to the vehicle speed, so it is possible to detect the specific frequency in an easy manner without the need of performing special frequency analysis.

Furthermore, the vibration suppression current calculator 11 includes an upper and lower limit value limitation section (upper and lower limit value limiter 14) that serves to set an upper limit value and a lower limit value for the calculated value of the vibration suppression current.

In this manner, by limiting the vibration suppression current by the upper and lower limit values with the provision of the upper and lower limit value limiter 14, vibration information (i.e., an abnormal state of the vehicle) can be transmitted to the driver upon occurrence of a certain level of steering vibration, and at the same time, it is also possible to avoid a structural or mechanistic load according to the vibration suppression control from becoming excessively large.

Embodiment 2

Figure 3:
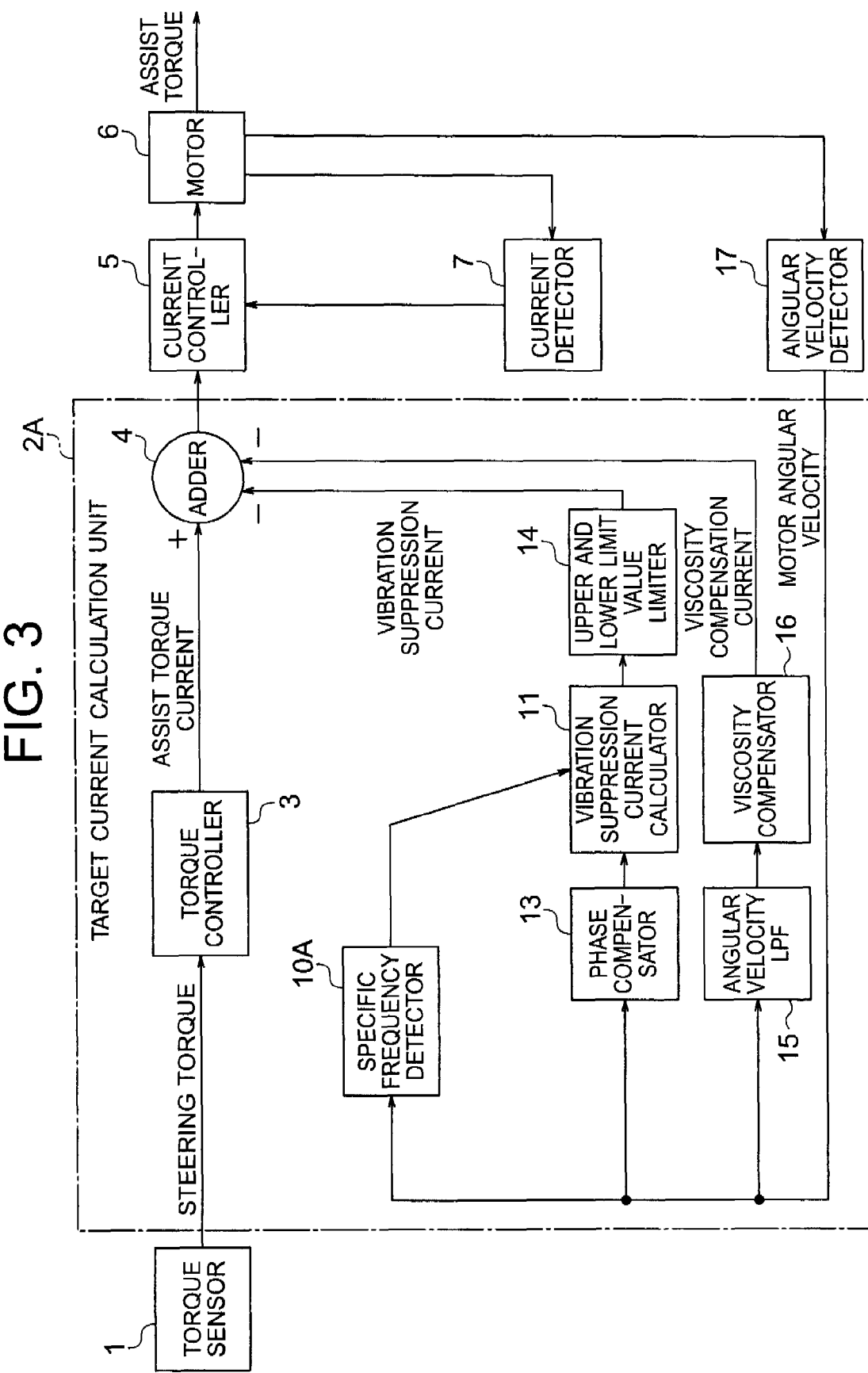
FIG. 3 is a block diagram showing the construction of an electric power steering control apparatus according to a second embodiment of the present invention.

In the above-mentioned first embodiment (FIG. 1), the specific frequency detector 10, serving to detect the specific frequency based on the vehicle speed, is used and the angle detector 9 and the angular velocity calculator 12 are used as the motor angular velocity detection section, but there may instead be used a specific frequency detector 10A, which operates based on the motor angular velocity, may be used, and at the same time, an angular velocity detector 17 may also be as the motor angular velocity detection section, as shown in FIG. 3.

FIG. 3 is a block diagram showing the construction of an electric power steering control apparatus according to a second embodiment of the present invention. In FIG. 3, the same parts or components as those described above (see FIG. 1) are identified by the same symbols or by the same symbols with "A" affixed to their ends, while omitting a detailed explanation thereof.

In this case, the value of a motor angular velocity detected by the angular velocity detector 17 is input to the specific frequency detector 10A, the phase compensator 13 and the angular velocity LPF 15.

Here, note that as the angular velocity detector 17, there may be used an angular velocity sensor, or a calculation unit or section that calculates the motor angular velocity from a terminal to terminal voltage and a motor current of the motor 6, or any other sensor of an arbitrary construction as long as it is able to detect the motor angular velocity.

The specific frequency detector 10A calculates a vibration frequency (i.e., a frequency band of 10-20 [Hz] where a shimmy vibration is generated) as the specific frequency based on the detected value of the motor angular velocity by using a frequency analysis such as, for example, real-time FFT etc., and inputs it to the vibration suppression current calculator 11. As a result, the vibration suppression current calculator 11 sets a gain for vibration suppression current calculation based on the specific frequency.

Figure 4:
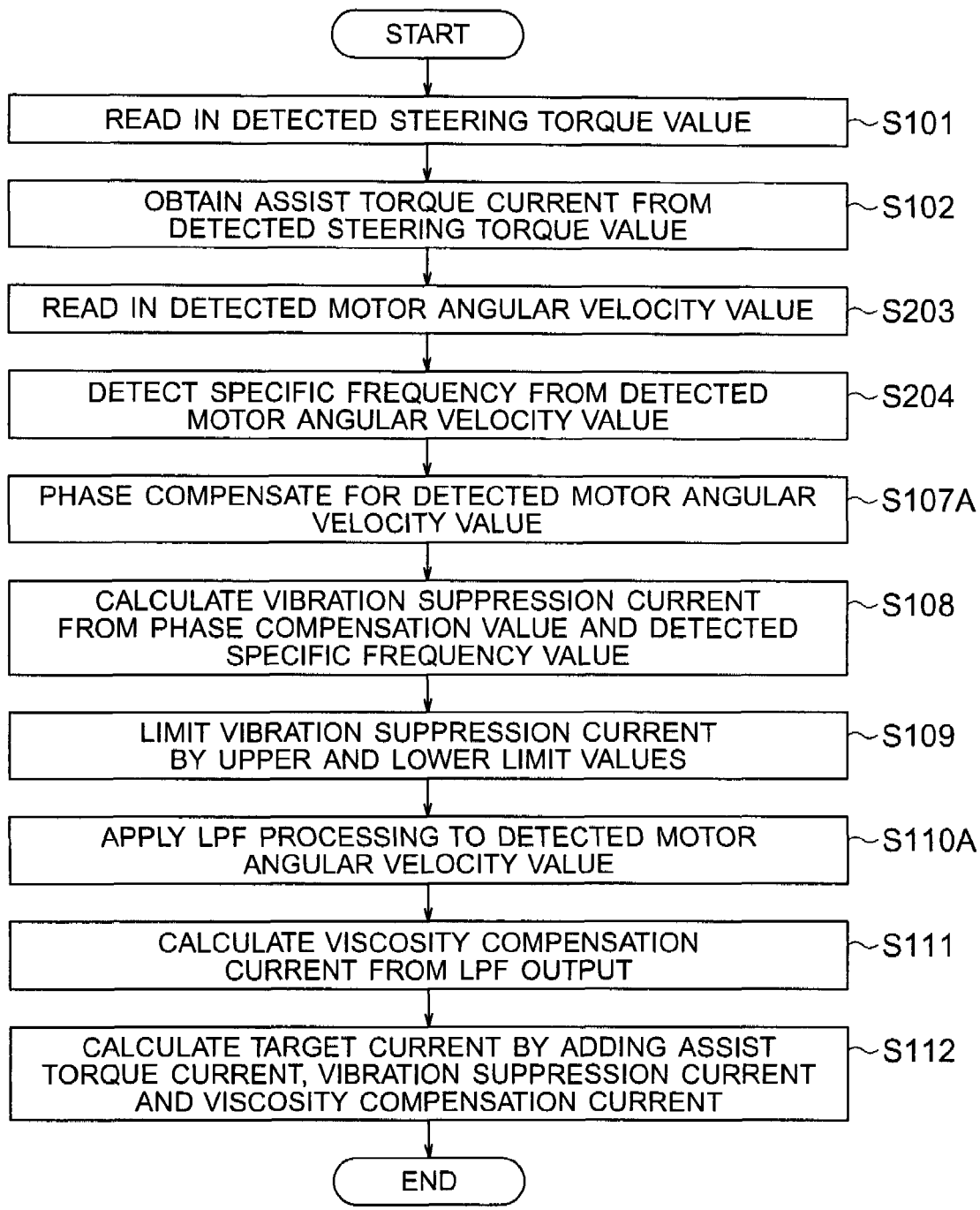
FIG. 4 is a flow chart illustrating an operation algorithm according to the second embodiment of the present invention.

Now, reference will be made to the operation of the electric power steering control apparatus according to the second embodiment of the present invention as illustrated in FIG. 3, while referring to a flow chart in FIG. 4. In FIG. 4, the same parts or components as those described above (see FIG. 2) are identified by the same symbols or by the same symbols with "A" affixed to their ends, while omitting a detailed explanation thereof. In this case, too, description will be given by focusing on an algorithm performed by the target current calculation unit 2 until a target current for the motor 6 is calculated, similarly as stated above.

First of all, the target current calculation unit 2A reads in a detected value of steering torque from the torque sensor 1 (step S101), and calculates an assist torque current based on the detected steering torque value by means of the torque controller 3 (step S102), after which the detected value of the motor angular velocity from the angular velocity detector 17 is read into the microcomputer and stored in the memory (step S203).

Subsequently, the specific frequency detector 10A reads in the detected motor angular velocity value stored in the memory, and detects a specific frequency based on the detected vehicle speed value (step S204).

In addition, the phase compensator 13 reads in the calculated value of the motor angular velocity stored in the memory, converts the phase of the detected motor angular velocity value, and stores it in the memory as a phase compensated value (step S107A).

Thereafter, the vibration suppression current calculator 11 calculates a vibration suppression current based on the detected specific frequency value and the phase compensated value (step S108), and the upper and lower limit value limiter 14 reads in the vibration suppression current, limits the vibration suppression current by the upper and lower limit values, and stores it in the memory as a final vibration suppression current (step S109).

Also, the angular velocity LPF 15 applies low-pass filtering processing to the detected value of the motor angular velocity, removes therefrom frequency components equal to or higher than the steering frequency, and then stores it in the memory as an LPF output of the motor angular velocity (step S110A).

Finally, the viscosity compensator 16 calculates a viscosity compensation current from the LPF output (step S111), and the adder 4 calculates a target current by adding the assist torque current, the vibration suppression current and the viscosity compensation current to one another (step S112).

Hereinafter, by repeatedly performing the above-mentioned processing operations at each control sampling period, the target current for the motor 6 is calculated in a successive manner.

Here, similarly as stated above, the phase compensator 13 is constructed such that it performs the proportional gain calculation of the motor angular velocity, the calculation of a time differential signal of the motor angular velocity, the differential gain calculation of the differential signal, the calculation of a time integral signal of the motor angular velocity, and the integral gain calculation of the integral signal, and carries out phase compensation by combining a proportional term, a differential term and an integral term with one another, but it may instead be constructed such that at least one of the calculation of the proportional gain, the calculation of the time differential signal and the differential gain, and the calculation of the time integral signal and the integral gain, is carried out.

Moreover, the phase compensator 13 may be constructed of a filter which serves to apply band-pass filtering processing to the motor angular velocity to calculate a band-pass filter gain thereof, and/or apply high-pass filtering processing to the motor angular velocity to calculate a high-pass filter gain thereof, and/or apply low-pass filtering processing to the motor angular velocity to calculate a low-pass filter gain thereof, and performs filtering processing based on at least one of the high-pass filter gain calculation, the low-pass filter gain calculation, and the band-pass filter gain calculation.

As described above, according to the second embodiment of the present invention, the specific frequency detector 10A detects the frequency at which the steering vibration is generated, in accordance with the detected motor angular velocity value from the angular velocity detector 17, so in addition to the above-mentioned operational effects obtained in the first embodiment, the following effects can also be achieved. That is, the angle detector 9 (see FIG. 1) is made unnecessary, and vibration suppression control can be carried out based on only the detected motor angular velocity value.

Embodiment 3

Figure 5:
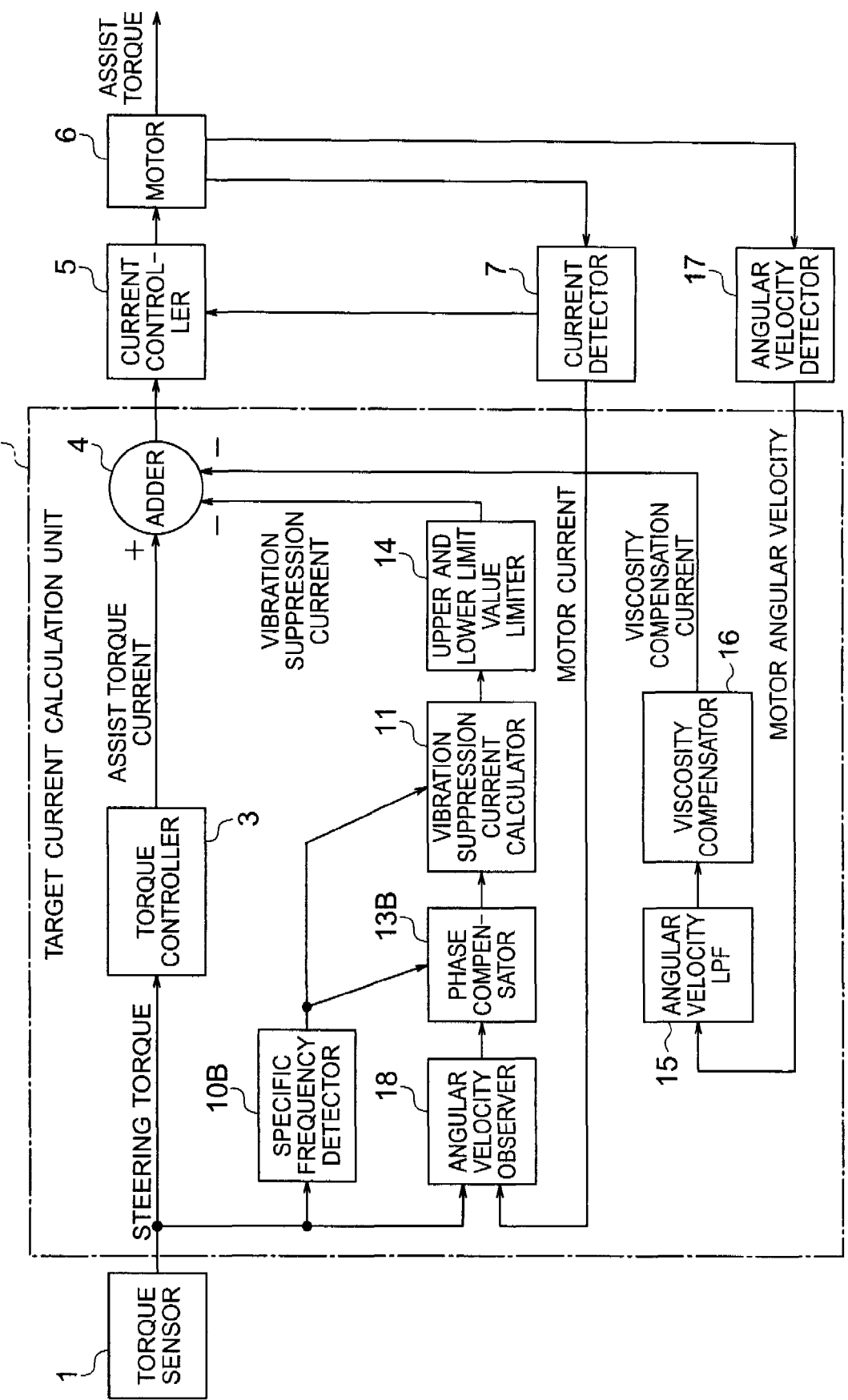
FIG. 5 is a block diagram showing the construction of an electric power steering control apparatus according to a third embodiment of the present invention.

Although in the above-mentioned second embodiment (FIG. 3), the specific frequency detector 10A and the phase compensator 13, which operate based on the detected motor angular velocity value, are used, there may instead be used a specific frequency detector 10B, which operates based on the detected steering torque value from the torque sensor 1, and a phase compensator 13B, which operates based on the detected motor current value from the current detector 7, as shown in FIG. 5. FIG. 5 is a block diagram showing the construction of an electric power steering control apparatus according to a third embodiment of the present invention. In FIG. 5, the same parts or components as those described above (see FIG. 1 and FIG. 3) are identified by the same symbols or by the same symbols with "B" affixed to their ends, while omitting a detailed explanation thereof. In this case, a target current calculation unit 2B is provided with an angular velocity observer 18. The angular velocity observer 18 estimates the motor angular velocity based on the detected steering torque value from the torque sensor 1 and the detected motor current value from the current detector 7.

In addition, the specific frequency detector 10B detects the specific frequency based on the detected steering torque value from the torque sensor 1. Further, the phase compensator 13B sets a gain based on an output signal of the specific frequency detector 10B, and applies phase compensation to the estimated value of the motor angular velocity input from the angular velocity observer 18.

In FIG. 5, the angular velocity observer 18 in the target current calculation unit 2B estimates the motor angular velocity based on a well-known technique (see, for example, Japanese patent application laid-open No. 2000-168600) by assuming that the motor 6 is a vibration system supported by the torque sensor 1 having a spring characteristic in a high frequency band.

Moreover, the gain of the phase compensator 13B is set by looking at the following so as to enhance a vibration suppression effect. In general, in case where the frequency of a shimmy vibration changes in accordance with the changing vehicle speed, the vibration suppression effect may sometimes become higher when the vibration is suppressed by the combination of a phase advanced differential term and a phase retarded integral term than when the vibration is suppressed by the damping of the same phase as that of the motor angular velocity.

Accordingly, the phase compensator 13B sets the proportional gain, the differential gain and the integral gain in accordance with the specific frequency from the specific frequency detector 10B. As a result, even if the shimmy vibration frequency changes in accordance with the vehicle speed, an optimal vibration suppression effect can be achieved.

Further, the specific frequency detector 10B can calculates, based on the detected steering torque value, a frequency band in which a vibration of 10-20 Hz is generated. For example, the specific frequency detector 10B calculates the vibration frequency from a frequency analysis such as real-time FFT, etc., thus contributing to the gain setting of the phase compensator 13B and the vibration suppression current calculator 11.

Figure 6:
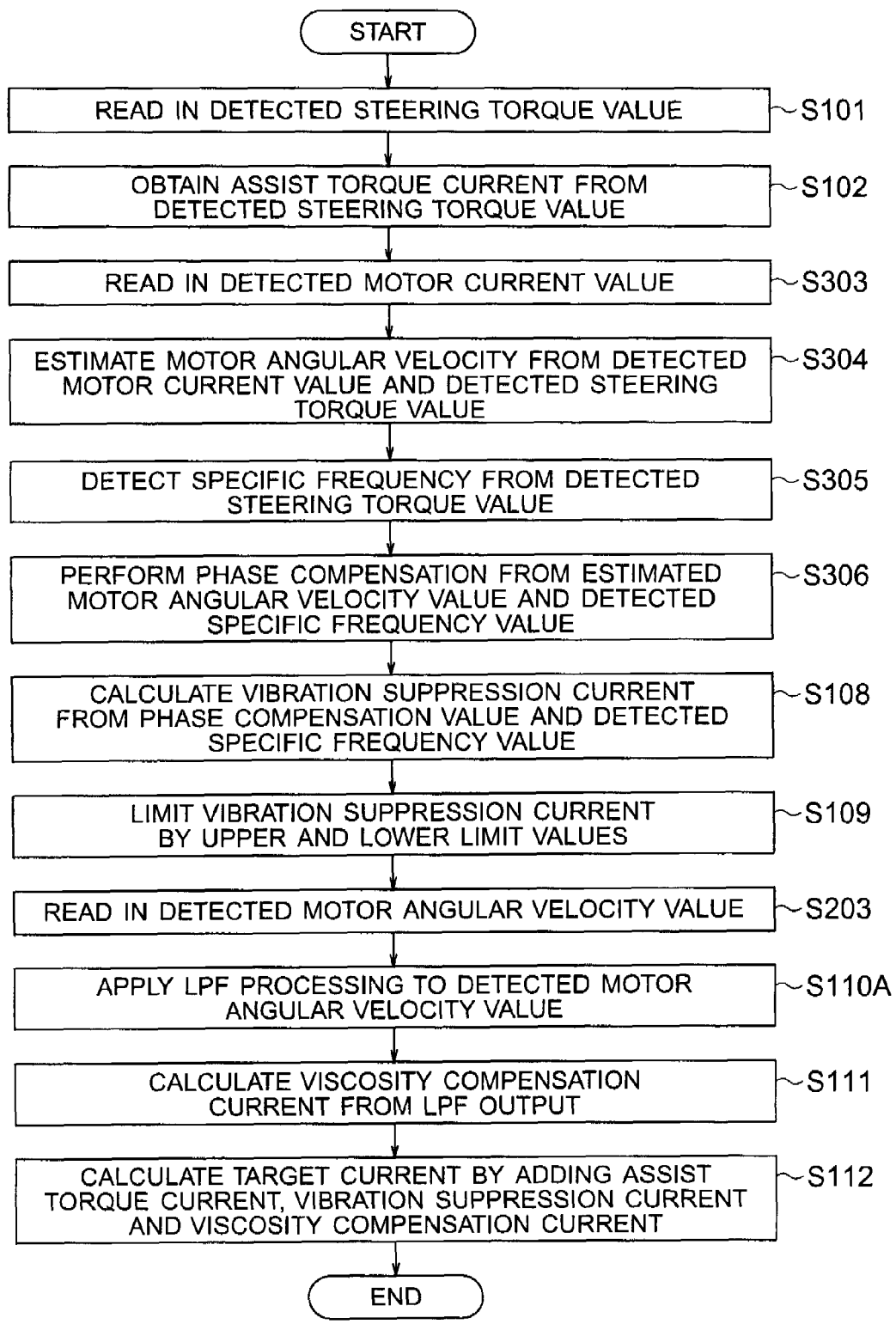
FIG. 6 is a flow chart illustrating an operation algorithm according to the third embodiment of the present invention.

Now, reference will be made to the operation of the electric power steering control apparatus according to the third embodiment of the present invention as illustrated in FIG. 5, while referring to a flow chart in FIG. 6. In FIG. 6, the same or like processing steps as those described above (see FIG. 2 and FIG. 4) are identified by the same symbols while omitting a detailed description thereof. In this case, too, description will be given by focusing on an algorithm performed by the target current calculation unit 2B until a motor target current is calculated, similarly as stated above.

First of all, the target current calculation unit 2B reads in a detected value of steering torque from the torque sensor 1 (step S101), and calculates an assist torque current based on the detected steering torque value by means of the torque controller 3 (step S102), after which the detected value of the motor current from the current detector 7 is read into the microcomputer and stored in the memory (step S303).

Subsequently, the angular velocity observer 18 estimates a motor angular velocity based on the detected motor current value and the detected steering torque value (step S304).

Also, the specific frequency detector 10B reads in the detected steering torque value stored in the memory, and detects a specific frequency based on the detected steering torque value (step S305).

Thereafter, the phase compensator 13B sets the proportional gain, the differential gain and the integral gain in accordance with the detected specific frequency value from the specific frequency detector 10B. Then, the phase compensator 13B reads in the estimated value of the motor angular velocity from the angular velocity observer 18, performs phase compensation on the estimated value of the motor angular velocity according to the individual proportional, differential and integral gains, and stores it in the memory as a phase compensation value (step S306).

Hereinafter, as stated above, the vibration suppression current calculator 11 calculates a vibration suppression current based on the detected specific frequency value and the phase compensated value (step S108), and the upper and lower limit value limiter 14 limits the vibration suppression current by the upper and lower limit values (step S109).

In addition, the target current calculation unit 2B reads in the detected value of the motor angular velocity from the angular velocity detector 17 (step S203), and the angular velocity LPF 15 applies low-pass filtering processing to the detected value of the motor angular velocity (step S110A), and the viscosity compensator 16 calculates a viscosity compensation current based on an LPF output of the angular velocity LPF 15 (step S111).

Finally, the adder 4 adds up the assist torque current, the vibration suppression current, and the viscosity compensation current to one another to calculate a target current for the motor 6, and stores it in the memory (step S112).

Hereinafter, by repeatedly performing the above-mentioned processing operations at each control sampling period, the target current for the motor 6 is calculated in a successive manner.

Here, similarly as stated above, the phase compensator 13B is constructed such that it performs the proportional gain calculation of the motor angular velocity, the calculation of a time differential signal of the motor angular velocity, the differential gain calculation of the differential signal, the calculation of a time integral signal of the motor angular velocity, and the integral gain calculation of the integral signal, and carries out phase compensation by combining a proportional term, a differential term and an integral term with one another, but it may instead be constructed such that at least one of the calculation of the proportional gain, the calculation of the differential gain, and the calculation of the integral gain, is carried out.

Moreover, the phase compensator 13B may be constructed of a filter that serves to apply band-pass filtering processing to the motor angular velocity to calculate a band-pass filter gain thereof, and/or apply high-pass filtering processing to the motor angular velocity to calculate a high-pass filter gain thereof, and/or apply low-pass filtering processing to the motor angular velocity to calculate a low-pass filter gain thereof, and performs filtering processing based on at least one of the high-pass filter gain calculation, the low-pass filter gain calculation, and the band-pass filter gain calculation.

In addition, in the phase compensator 13B, the proportional gain, the differential gain and the integral gain are set in accordance with detected value of the specific frequency from the specific frequency detector 10B, but a high-pass filter time constant and the high-pass filter gain, a low-pass filter time constant and the low-pass filter gain, and a band-pass filter time constant and the low-pass filter gain of the phase compensator 13B may instead be set.

As described above, according to the third embodiment of the present invention, the specific frequency detector 10B detects the frequency at which a steering vibration (shimmy vibration, etc.) is generated, in accordance with the detected value of steering torque on which an actual steering vibration is superposed, so it is possible to detect the vibration frequency in a high degree of precision.

In addition, the angular velocity observer 18 estimates the motor angular velocity based on the detected steering torque value and the detected motor current value, so it is possible to obtain the motor angular velocity even in an electric power steering apparatus which is not provided with the angular velocity detector 17, the angle detector 9 (see FIG. 1), or the like.

Moreover, the phase compensator 13B serves to make variable at least one of a proportional gain calculation section, a differential gain calculation section and a integral gain calculation section based on the detected specific frequency value from the specific frequency detector 10B.

Further, the phase compensating section 13B also serves to make variable at least one gain of the band-pass filter time constant or the band-pass filter gain of the band-pass filter gain calculation section, the high-pass filter time constant or the high-pass filter gain of the high-pass filter gain calculation section, and the low-pass filter time constant or the low-pass filter gain of the low-pass filter gain calculation section, in accordance with the detected specific frequency value from specific frequency detection section 10B.

In this manner, the proportional gain, the differential gain and the integral gain of the phase compensator 13B are set based on the detected specific frequency value by means of the phase compensating section 13B, and even if the vibration frequency (shimmy vibration frequency) changes, it is possible to perform optimal vibration suppression control by setting the band-pass filter time constant and the band-pass filter gain, the high-pass filter time constant and the high-pass filter gain, and the low-pass filter time constant and the low-pass filter gain of the phase compensator 13B.

While the invention has been described in terms of preferred embodiments, those skilled in the art will recognize that the invention can be practiced with modifications within the spirit and scope of the appended claims.

What is claimed is:

1. An electric power steering control apparatus comprising:
    a steering torque detection section that detects steering torque generated by a driver of a vehicle;
    a motor that generates assist torque in accordance with said steering torque;
    a motor angular velocity detection section that detects the angular velocity of said motor;
    a specific frequency detection section that detects the frequency of a steering vibration generated due to the structure of said vehicle;
    a phase compensation section that converts the phase of said motor angular velocity based on a detected value of said motor angular velocity; and
    a vibration suppression current calculation unit that calculates a steering vibration suppression current for suppression of said steering vibration based on the respective output signals of said specific frequency detection section and said phase compensation section.

2. The electric power steering control apparatus as set forth in claim 1, wherein
    said phase compensation section includes at least one of: a proportional gain calculation section that amplifies and deamplifies the magnitude of said motor angular velocity;
    a differentiator that calculates a time differential signal of said motor angular velocity and a differential gain calculation section that amplifies and deamplifies a differential signal;
    an integrator that calculates a time integral signal of said motor angular velocity and an integral gain calculation section that amplifies and deamplifies an integral signal.

3. The electric power steering control apparatus as set forth in claim 2, wherein
    said phase compensator serves to make variable at least one of said proportional gain calculation section, said differential gain calculation section and said integral gain calculation section in accordance with the output signal from said specific frequency detection section.

4. The electric power steering control apparatus as set forth in claim 1, wherein
    said phase compensation section includes at least one of:
    a band-pass filter gain calculation section that applies band-pass filtering processing to said motor angular velocity to amplify and deamplify a band-pass filtered signal;
    a high-pass filter gain calculation section that applies high-pass filtering processing to said motor angular velocity to amplify and deamplify a high-pass filtered signal; and
    a low-pass filter gain calculation section that applies low-pass filtering processing to said motor angular velocity to amplify and deamplify a low-pass filtered signal.

5. The electric power steering control apparatus as set forth in claim 4, wherein
    said phase compensation section serves to make variable at least one gain of a band-pass filter time constant or a band-pass filter gain of said band-pass filter gain calculation section, a high-pass filter time constant or a high-pass filter gain of said high-pass filter gain calculation section, and a low-pass filter time constant or a low-pass filter gain of said low-pass filter gain calculation section, in accordance with the output signal of said specific frequency detection section.

6. The electric power steering control apparatus as set forth in claim 1, further comprising:
a vehicle speed detection section that detects the vehicle speed of said vehicle;
wherein said specific frequency detection section detects a frequency at which said steering vibration is generated, in accordance with said vehicle speed.

7. The electric power steering control apparatus as set forth in claim 1, wherein
said specific frequency detection section detects a frequency at which said steering vibration is generated, in accordance with the detected value of said motor angular velocity.

8. The electric power steering control apparatus as set forth in claim 1, wherein
said specific frequency detection section detects a frequency at which said steering vibration is generated, in accordance with a detected value of said steering torque.

9. The electric power steering control apparatus as set forth in claim 1, wherein
said vibration suppression current calculation section includes an upper and lower limit value limitation section that serves to set an upper limit value and a lower limit value for a calculated value of said steering vibration suppression current.

\* \* \* \* \*